US007701387B2

(12) United States Patent
Syrjärinne

(10) Patent No.: US 7,701,387 B2
(45) Date of Patent: Apr. 20, 2010

(54) SUPPORTING AN ASSISTED SATELLITE BASED POSITIONING

(75) Inventor: Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/002,246

(22) Filed: Dec. 13, 2007

(65) Prior Publication Data

US 2008/0150796 A1 Jun. 26, 2008

Related U.S. Application Data

(63) Continuation of application No. PCT/IB2005/001638, filed on Jun. 13, 2005.

(51) Int. Cl.
*G01S 5/14* (2006.01)
(52) U.S. Cl. .................................. 342/357.03
(58) Field of Classification Search ............ 342/357.01, 342/357.02, 357.06, 357.09, 357.1, 357.14, 342/357.15, 357.03
See application file for complete search history.

(56) References Cited

U.S. PATENT DOCUMENTS

| 5,225,842 | A * | 7/1993 | Brown et al. ........... 342/357.09 |
| 5,945,944 | A | 8/1999 | Krasner |
| 6,133,874 | A | 10/2000 | Krasner et al. |
| 6,266,533 | B1 | 7/2001 | Zadeh et al. ................ 455/456 |
| 6,429,811 | B1 | 8/2002 | Zhao et al. ............ 342/357.09 |
| 6,542,820 | B2 * | 4/2003 | LaMance et al. ......... 342/357.1 |
| 6,678,510 | B2 | 1/2004 | Syrjarinne et al. |
| 6,748,202 | B2 | 6/2004 | Syrjarinne et al. |
| 2002/0186165 | A1 * | 12/2002 | Eschenbach ........... 342/357.03 |
| 2002/0190898 | A1 * | 12/2002 | Abraham et al. ....... 342/357.09 |
| 2003/0023379 | A1 * | 1/2003 | Diggelen et al. ............ 701/215 |
| 2005/0068229 | A1 | 3/2005 | Moilanen et al. ....... 342/357.15 |
| 2005/0090265 | A1 * | 4/2005 | Abraham ................. 455/456.1 |
| 2006/0290566 | A1 * | 12/2006 | Syrjarinne et al. ..... 342/357.15 |

FOREIGN PATENT DOCUMENTS

EP 1336866 8/2003

(Continued)

OTHER PUBLICATIONS

P.K. Enge, Wide Area Augmentation System, in Global Positioning System: Theory and Applications, vol. II, edited by B.W. Parkinson et al., American Institute of Aeronautics and Astronautics, Inc., 1995.*

(Continued)

*Primary Examiner*—Thomas H Tarcza
*Assistant Examiner*—Fred H Mull

(57) ABSTRACT

For supporting a satellite based positioning of a mobile arrangement (30,40) with assistance data, a communication network converts parameters of a dedicated orbit model describing a movement of a satellite (50,60), which dedicated orbit model is defined for a particular satellite based positioning system, into parameters of a common orbit model describing a movement of a satellite (50,60). Alternatively or in addition, the network replaces a reference value that is based on a satellite based positioning system time in available parameters of an orbit model by a reference value that is based on a communication system time. After the parameter conversion and/or the reference value replacement, the parameters are provided as a part of assistance data for the satellite based positioning. Alternatively or in addition, a set of data is transmitted in one direction between the mobile arrangement and the communication network, which is independent of the employed positioning mode.

19 Claims, 2 Drawing Sheets

FOREIGN PATENT DOCUMENTS

| WO | WO 01/11382   | 2/2001  |
|----|---------------|---------|
| WO | WO 02/067439  | 8/2002  |
| WO | 03/005055     | 1/2003  |
| WO | 2004/000732   | 12/2003 |
| WO | WO 2006/043123| 4/2006  |

OTHER PUBLICATIONS

"3$^{rd}$ Generation Partnership Project; Technical Specification Group GSM Edge Radio Access Network; Location Services (LCS); Broadcast Network Assistance for Enhanced Observed Time Difference (E-OTD) and Global Positioning System (GPS) Positioning Methods (Release 1999);" 3GPP TS 04.35 V8.3.0, Jan. 2001, pp. 1-35.

"The Assisted GNSS, Technology and Applications;" M. Monnerat et al.; ION GNSS 17$^{th}$ International Technical Meeting of the Satellite Division; Sep. 21, 2004; pp. 2479-2488.

"Introduction of GNSS, Release 7;" 3GPP TSG-GERAN2 Meeting #23bis Change Request; Mar. 7-11, 2005.

L 1 Band Part of Galileo Signal in Space ICD (SIS ICD); Galileo Joint Undertaking; 2005, pp. 1-30.

"3GPP TSG GERAN Meeting #24, TSG GERAN WG2 #23bis; Meeting Report;" Apr. 4-8, 2005.

International Application No. PCT/IB2005/001641, Form PCT/ISA/220 (2 pages) dated Mar. 3, 2006 with Form PCT/ISA/210 (4 sheets) and Form PCT/ISA/237 (7 pages) Transmitting International Search Report and Written Opinion of the International Searching Authority (EPO).

"The Assisted GNSS, Technology and Applications" by Michel Monnerat et al; ION GNSS 17$^{th}$ International, Technical Meeting of the Satellite Division, Sep. 21, 2004, pp. 2479-2488, XP-002366445.

IGS Products, http://igscb.jpl.nasa.gov/components/prods.html, 3 pages, Nov. 21, 2005.

Csr GPS and location aware solutions for portable devices, http://www.cursor-system.com/cps/news_detail.asp?ID=131, 1 page, dated 2007.

L1 band part of Galileo Signal in Space ICD (SIS ICD), 2005, by Galileo Joint Undertaking.

3GPP TSG GERAN Meeting #24, Dublin, Ireland, Apr. 4-8, 2005, TSG GERAN WG2 #23bis, Meeting Report, pp. 1-32.

3GPP TSG GERAN2 #23bis, Helsinki, Finland, Tdoc G2-050074, Mar. 7-11, 2004, "Introduction of GNSS", pp. 1-12.

3GPP TSG-GERAN2 Meeting #23bis, Tdoc G2-050075, Helsinki, Finland Mar. 7-11, 2005, Agenda Item: 5.4, CR-Form-v7, Change Request, pp. 1-37.

Singapore Office Action issued in corresponding Singapore patent application No. 200718425-2 with Austrian Patent Office Search Report dated May 5, 2009, 11 pages.

* cited by examiner

SUPPORTING AN ASSISTED SATELLITE BASED POSITIONING

CROSS-REFERENCE TO RELATED APPLICATION

This application is a continuation of International Application Serial No. PCT/IB2005/001638 filed Jun. 13, 2005.

TECHNICAL FIELD

Methods are shown for supporting a satellite based positioning of a mobile arrangement with assistance data and using assistance data. The invention relates equally to an apparatus supporting a satellite based positioning of a mobile device with assistance data and to apparatus supporting a satellite based positioning of the mobile arrangement using assistance data. The invention relates equally to corresponding software codes and to corresponding software program products.

BACKGROUND

Currently there are two operating satellite based positioning systems, the American system GPS (Global Positioning System) and the Russian system GLONASS (Global Orbiting Navigation Satellite System). In the future, there will be moreover a European system called GALILEO. A general term for these systems is GNSS (Global Navigation Satellite System).

For GPS, for example, more than 20 satellites—also referred to as space vehicles (SV)—orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a nominal bandwidth of 20.46 MHz. It is repeated every 1023 bits, the epoch of the code being 1 ms. The bits of the C/A code are also referred to as chips. The carrier frequency of the L1 signal is further modulated with the navigation information at a bit rate of 50 bit/s. The navigation information comprises in particular a timestamp indicating the time of transmission and ephemeris and almanac parameters.

GPS ephemeris and almanac parameters are basically satellite orbit parameters for a short-term polynomial orbit model of the true satellite trajectory. The parameters are maintained and updated at a GPS control server and further updated at the satellites. Based on available ephemeris or almanac parameters, an algorithm can estimate the position of the satellite for any time while the satellite is in the respective described section. The polynomial orbit models have only one degree of freedom, that is, time. The time base for ephemeris and almanac parameters is the GPS time, namely the GPS time-of-week (TOW). The satellite position calculation is basically an extrapolation of the satellite positions along the orbit as a function of time starting from a known initial position. The initial position is also defined by parameters in the ephemeris and almanac data. A time-stamp moreover indicates when the satellite is at the given initial orbital position. The time-stamps are called time-of-ephemeris (TOE) for ephemeris parameters and time-of-applicability (TOA) for the almanac parameters. Both the TOE and TOA are referenced into GPS TOW.

Ephemeris parameters can generally be used only during 2-4 hours for determining the position of a satellite, due to the rather short-term fitting. On the other hand, a better accuracy can be achieved with this short fit than with a longer fit. The achievable accuracy is 2-5 meters. Almanac parameters, in contrast, can be used for a coarse satellite positioning even for weeks, but they are not suitable for the actual accurate positioning due to the poor accuracy resulting from the long-term fit and also from a smaller number of parameters. Ephemeris and almanac data are broadcast from the GPS satellites in a format specified in the open GPS interface control document (ICD) called ICD-GPS-200. Currently, all GPS receivers have to support this format.

A GPS receiver of which the position is to be determined receives the signals transmitted by the currently available satellites, and it detects and tracks the channels used by different satellites based on the different comprised C/A codes. For the acquisition and tracking of a satellite signal, a signal received by a radio frequency (RF) portion of the GPS receiver is first converted into the baseband. In a baseband portion, frequency errors, for instance due to the Doppler effect, are removed by a mixer. Then, the signal is correlated with replica codes that are available for all satellites. The correlation can be performed for example using a matched filter. The correlation values can further be integrated coherently and/or incoherently in order to increase the sensitivity of the acquisition. A correlation value exceeding a threshold value indicates the C/A code and the code phase, which are required for despreading the signal and thus to regain the navigation information.

Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the time of flight required by the signal to propagate from the satellite to the receiver. By multiplying this time of flight with the speed of light, it is converted to the distance, or range, between the receiver and the respective satellite. Further, the receiver estimates the positions of the satellites at the time of transmission, usually based on the ephemeris parameters in the decoded navigation messages.

The computed distances and the estimated positions of the satellites then permit a calculation of the current position of the receiver, since the receiver is located at an intersection of the ranges from a set of satellites.

Similarly, it is the general idea of GNSS positioning to receive satellite signals at a receiver which is to be positioned, to measure the time it took the signals to propagate from an estimated satellite position to the receiver, to calculate from this propagation time the distance between the receiver and the respective satellite and further the current position of the receiver, making use in addition of the estimated positions of the satellites. The European Satellite Navigation System, Galileo, can be expected to have an ICD of its own. According to the draft "L1 band part of Galileo Signal in Space ICD (SIS ICD)", 2005, by Galileo Joint Undertaking, the Galileo ICD will be quite close to the GPS ICD, but not exactly the same. There will be Galileo ephemeris and almanac data, and both will be related to a Galileo system time.

A GPS positioning can be performed in three different positioning modes. The first mode is a standalone GPS based positioning. This means that the GPS receiver receives signals from GPS satellites and calculates from these signals its position without any additional information from other sources. The second mode is a network-assisted mobile station based GPS positioning. For this mode, the GPS receiver may be associated to a mobile communication device. The GPS receiver can be integrated into the mobile communication device or be an accessory for the mobile communication device. A mobile communication network provides assistance data, which is received by the mobile communication device and forwarded to the GPS receiver to improve its performance. Such assistance data can be for example at least ephemeris, position and time information. The positioning calculations are performed also in this case in the GPS receiver. The third mode is a network-based mobile station assisted GPS positioning. For this mode, the GPS receiver is associated as well to a mobile communication device. In this mode, a mobile communication network provides at least acquisition assistance and time information via the mobile communication device to the GPS receiver for supporting the measurements. The measurement results are then provided via the mobile communication device to the mobile communication network, which calculates the position. The second and the third approach are also referred to in common as assisted-GPS (A-GPS). If the assistance data comprises a reference position and ephemeris data for a particular satellite, for example, the GPS receiver may determine the approximate satellite position and motion and thus limit the possible propagation time of the satellite signal and the occurring Doppler frequency. With known limits of the propagation time and the Doppler frequency, also the possible code phases that have to be checked can be limited.

Assistance data for A-GPS has been specified and standardized for all cellular communication systems. The delivery of assistance data is build on top of cellular communication system specific protocols, namely RRLP for the Global System for Mobile Communications (GSM), IS-801 for Code Division Multiple Access (CDMA), RRC for Wideband CDMA (WCDMA) and OMA SUPL. The mobile station assisted mode is currently deployed in CDMA networks in the U.S.A. for positioning of emergency calls.

There are many common features in all of the cellular protocols, for example, the supported GPS modes. That is, all cellular protocols support mobile station based GPS, mobile station assisted GPS and standalone GPS. Further, all protocols have a high dependency on GPS. As indicated above, the assistance data that is provided for A-GPS by a cellular communication network may comprise satellite navigation data including GPS ephemeris and almanac data. All cellular protocols for GPS assistance data define to this end ephemeris and almanac data information elements (IE) with only slight differences. The ephemeris and almanac IEs defined in the cellular protocols are practically identical with those defined in the ICD-GPS-200. Thus, they have also the same limitations and expected accuracy as the ephemeris and almanac data which is broadcast by the satellites. This correspondence makes it easy for a GPS receiver to use the assistance data in position calculations, as it requires practically no conversions or extra software. Also a GPS ionosphere model is sent over the cellular link according to all cellular protocols. The GPS assistance data elements are linked to GPS time according to all cellular protocols. Moreover, the acquisition assistance is tailor-made for GPS only and cannot be used for position calculation in the mobile station according to all cellular protocols. Finally, all data elements are indexed in accordance with the GPS satellite constellation according to all cellular protocols.

However, while there are many common features in all of the GPS related cellular protocols, there are also differences. This means that terminal software receiving the assistance data has to either have an adaptation layer for the cellular protocols or support only some of the cellular protocols. Moreover, the differences in the cellular protocols, especially in the message contents, have effects on the A-GPS performance in terms of time-to-first fix and sensitivity.

A further problem is that in order to use the ephemeris or almanac parameters for predicting accurately the expected satellite code phases and Doppler frequencies in the GPS receiver for the initial signal acquisition, the assistance data from the network has to also include an accurate GPS TOW assistance. In GSM and WCDMA networks, an accurate GPS TOW delivery requires deployment of Location Measuring Units (LMU) at every cellular base station, which are able themselves to acquire and evaluate GPS signals. LMUs, however, are expensive and require a continuous maintenance.

Moreover, the current ephemeris and almanac data formats in the cellular protocols are based on formats defined specifically for GPS. Assistance data will also be of importance for Galileo, in order to ensure that the performance of Galileo will be equal to A-GPS. It can be expected that the Galileo ephemeris format will be different from the GPS ephemeris and almanac formats so that the GPS assistance data format can not simply be used for Galileo as well. If Galileo ephemeris is different from GPS ephemeris, the cellular standards have to be augmented with Galileo specific information elements, and the use of Galileo for a positioning requires extra software in the receivers. Moreover, Galileo and GPS may have a different quality of service, that is, the Galileo ephemeris data may be more accurate than the GPS ephemeris data, resulting in a better accuracy of a Galileo-based positioning. Moreover, Galileo and GPS ephemeris parameters may have different life spans. In this case, simultaneous assistance data updating is not possible but assistance data updates need to be scheduled independently for Galileo and GPS.

Thus, there are various problems with the current GPS assistance data.

It has been proposed to augment 3GPP GPS assistance data elements for Galileo signals by modifying the indexing of the ephemeris data elements so that the indexing could also include Galileo satellites. The format of the ephemeris data would then be essentially the same for GPS and Galileo satellites. With this solution, GPS and Galileo assistance data would still be restricted to the limitations of the current GPS ephemeris and almanac data, and also a GPS TOW delivery is still required.

Further, it is known to enhance the accuracy and integrity of orbit models by means of correction data. The European Geostationary Navigation Overlay Service (EGNOS) and the Wide Area Augmentation System (WAAS), for instance, determine GPS correction data, which take account, for example, of GPS signal delays caused by the atmosphere and the ionosphere. The correction data is transmitted via geostationary satellites and the data can be received by suitable GPS receivers and be used for increasing the accuracy of a GPS based positioning. Further, differential GPS (DGPS) corrections had been introduced for mitigating the effect of selective availability. They are suited to remove atmosphere effects and satellite position and clock drifts. WAAS, EGNOS and DGPS corrections are always bound to a single set of ephemeredes, though. When long-term satellite orbital parameters are used instead of normal ephemeris parameters, WAAS, EGNOS and DGPS corrections cannot be used, because they are bound to the normal ephemeris data.

SUMMARY OF THE INVENTION

Alternatives are provided to the conventional provision and use of assistance data for a satellite based positioning of a mobile arrangement.

I

According to a first aspect of the disclosure, a first method is proposed for supporting a satellite based positioning of a mobile arrangement with assistance data, wherein the mobile arrangement is adapted to communicate with a communication network and to acquire signals transmitted by satellites of at least one satellite based positioning system. The method comprises converting in the communication network available parameters of a dedicated orbit model describing a movement of a satellite, which dedicated orbit model is defined for a particular satellite based positioning system, into parameters of a common orbit model describing a movement of a satellite. The method further comprises providing the converted parameters as a part of assistance data for the satellite based positioning.

According to the first aspect of the disclosure, moreover a second method is proposed for supporting a satellite based positioning of a mobile arrangement using assistance data, wherein the mobile arrangement is adapted to communicate with a communication network and to acquire signals transmitted by satellites of at least one satellite based positioning system. This method comprises receiving at the mobile arrangement assistance data from the communication network including parameters of a common orbit model describing a movement of a satellite. The method further comprises estimating a position of a satellite of the at least one satellite based positioning system based on the received parameters of the common orbit model.

According to the first aspect of the disclosure, moreover a network element for a communication network supporting a satellite based positioning of a mobile arrangement with assistance data is proposed, wherein the mobile arrangement is adapted to communicate with the communication network and to acquire signals transmitted by satellites of at least one satellite based positioning system. The network element comprises processing means. The processing means are adapted to convert available parameters of a dedicated orbit model describing a movement of a satellite, which dedicated orbit model is defined for a particular satellite based positioning system, into parameters of a common orbit model describing a movement of a satellite. The processing means are further adapted to provide the converted parameters as a part of assistance data for the satellite based positioning.

According to the first aspect of the disclosure, moreover a mobile arrangement supporting a satellite based positioning of the mobile arrangement using assistance data is proposed. The mobile arrangement comprises a satellite signal receiver adapted to acquire signals transmitted by satellites of at least one satellite based positioning system. The mobile arrangement further comprises a communication component adapted to receive from the communication network assistance data with parameters of a common orbit model describing a movement of a satellite. The mobile arrangement further comprises a processor or processing means adapted to estimate a position of a satellite of the at least one satellite based positioning system based on received parameters of the common orbit model.

According to the first aspect of the disclosure, moreover a system is proposed which comprises the proposed network element of the first aspect of the invention and the proposed mobile arrangement of the first aspect of the invention.

According to the first aspect of the disclosure, moreover a first software code for supporting a satellite based positioning of a mobile arrangement with assistance data is proposed, wherein the mobile arrangement is adapted to communicate with a communication network and to acquire signals transmitted by satellites of at least one satellite based positioning system. When being executed by a processing unit of a network element of the communication network, the software code realizes the first method of the first aspect of the invention.

According to the first aspect of the disclosure, moreover a first software program product is proposed, in which the first software code proposed for the first aspect of the invention is stored.

According to the first aspect of the disclosure, moreover a second software code for supporting a satellite based positioning of a mobile arrangement using assistance data is proposed, wherein the mobile arrangement is adapted to communicate with a communication network and to acquire signals transmitted by satellites of at least one satellite based positioning system. When being executed by a processing unit of a mobile arrangement, the software code realizes the second method of the first aspect of the invention.

According to the first aspect of the disclosure, moreover a second software program product is proposed, in which the second software code proposed for the first aspect of the invention is stored.

The first aspect of the disclosure is based on the idea that the format of parameters of an orbit model, which are provided as assistance data for a satellite based positioning, could be decoupled from the format of orbit parameters that are defined in the scope of a respective satellite based positioning system. It is proposed to this end that available orbit parameters for a particular satellite based positioning system are converted into parameters of a common orbit model. The common orbit model may, but does not have to be, defined in common for at least two satellite based positioning systems. It is to be noted that the term "conversion" is meant to include as well a re-calculation of the parameters for the common orbit model.

It is an advantage of the first aspect of the disclosure that the same orbit model can be used for the assistance data of various satellite based positioning systems. With the common orbit model, a similar performance in terms of accuracy can be achieved for all supported satellite based positioning systems. Also new satellite based positioning systems can be added easily. Thus, assisted positioning like A-GNSS could be harmonized in various communication standards, for instance in all cellular standards. In the mobile arrangements, the common orbit model facilitates moreover a hybridization, for example a Galileo-GPS hybridization which allows a mobile arrangement basing positioning calculations on satellite signals of GPS satellites and Galileo satellites. It is also possible to use the common orbit model as a single orbit model for a particular satellite based positioning system, for instance instead of the GPS ephemeris and almanac model, and equally as a single orbit model for all positioning modes, for instance for mobile station assisted GNSS and mobile station based GNSS. Using a common orbit model thus reduces the number of data elements that have to be supported in the communication standards. The size and complexity of a positioning software in a mobile arrangement can be minimized when using the common orbit model in a mobile arrangement, possibly for a hybrid GPS/Galileo receiver, that dispenses with a standalone positioning. That is, in case the mobile arrangement itself does not have any software for decoding satellite navigation data, but only software supporting the proposed common orbit model, even though this is not a preferred embodiment. The same common orbit model could even be used in addition for providing assistance data for terrestrial positioning systems.

It is also an advantage of the first aspect of the disclosure that possible changes in the format of parameters of dedicated orbit models, like the parameters defined in the ICD-GPS-200, do not necessitate changes in the converted parameters. The interface between the communication network and the mobile arrangements may thus stay the same. Only the implemented parameter conversion has to be adapted.

It is also an advantage of the first aspect of the disclosure that the format of the converted parameters is not tied to the format of the original parameters. The conversion thus enables a provision of enhanced parameters and thus an improvement of the performance of an assisted positioning.

The common orbit model may comprises for example more parameters than a dedicated orbit model or parameters having a longer word length than corresponding parameters of a dedicated orbit model. This allows increasing the accuracy of the orbit model and/or the validity time of the respective parameters. If the orbit model is more accurate, also the achievable positioning can be more accurate. If the parameters are valid for a longer time, fewer updates are required, which saves communication bandwidth in the communication system.

The Jet Propulsion Laboratory of the California Institute of Technology (JPL) has already shown that it is possible to increase the accuracy and life span of the satellite orbit models by increasing the word length of the orbital parameters. The International GPS Service, IGS, by JPL shares high-accuracy orbit models for a 48 hours period over the Internet. JPL publishes so called ultra-rapid orbit position data that is valid and accurate at decimeter level at least +/−24 h, that is, 24 hours ahead in time. The data is typically in sp3 format, which contains satellite position and velocity coordinates in ECEF (Earth Centered Earth Fixed) frame, clock time and accuracy estimates sampled at some interval, typically 15 min. The data is provided for the full GPS satellite constellation. The data is not suitable for terminal positioning as such but must be modeled e.g. by polynomial fitting to provide a compact set of parameters for a terminal for satellite position and velocity extrapolation as function of time. For the polynomial fitting, it is possible to use the "polynomial format" defined for the GPS ephemeris data. Modeling is also needed for the satellite clock drifting. The IGS offers accurate information also for satellite clocks that need to be modeled, for example, with polynomials too. A clock model is included in the standard satellite broadcast in subframe 1 in accordance with the GPS ICD, and it is provided as well in cellular assistance. The clock model is typically assumed to be a part of ephemeris, but it is still a model of its own.

Global Locate Inc. has already shown that it is possible to increase the accuracy and life span of the satellite orbit models by calculating the ICD-GPS-200 compatible polynomial fit by using alternative fitting criteria than used by GPS. The satellite ephemeris service by Global Locate Inc. uses the ICD-GPS-200 format to carry long-term orbit models for the full GPS constellation. The life span of the long-term model can be much longer than the life span of the broadcasted ephemeris. The latter approach, however, is still bound to the GPS ephemeris format.

The available parameters of a dedicated orbit model can be for example broadcast ephemeris or other orbital data, ephemeris or other orbital data provided by GNSS control segments, and/or ephemeris or other orbital data provided by an external source, such as IGS.

The common orbit model can be based on Keplerian orbits and parameters used for the GPS ephemeris and almanac models. But it is also possible to use various other representation to model the satellite position information. Examples are Spline polynomials, Hermitean polynomials, piece-wise continuous polynomials, etc. By way of example, a fourth-order polynomial model could be fitted into the true satellite orbital trajectory given in an ECEF frame. The polynomial model can be fitted using a criterion that minimizes the root mean of squared errors (RMSE). The polynomial model can then be used to extrapolate the satellite position information forward in time.

Due to its sp3-format, including an ECEF position, an ECEF velocity and clock bias/drift accuracies (std), the IGS data is easy to use, for example, in polynomial fitting. Modeling can be done e.g. by Spline or Hermitean polynomial fitting so that the polynomials are fitted into satellite position and velocity data for the period of the previous 24-48 h. With the proposed common orbit model, there is more freedom to select the parameters compared to simply using the "polynomial format" defined for the GPS ephemeris data. The polynomial order, the number of parameters and the word lengths can be selected according to the desired accuracy and expected life span of the fit.

The common orbit model parameters which are eventually provided as a part of assistance data may comprise parameters for the entire satellite constellation of a particular satellite based positioning system, the entire satellite constellation of a plurality of satellite based positioning systems, or a part of one or more satellite constellations, depending on the capabilities of the mobile arrangement.

The supported satellite based positioning systems can be selected arbitrarily. They may comprise for example GPS, GLONASS and Galileo, but equally EGNOS and WAAS, etc.

In addition to the converted parameters, the provided assistance data may comprise in particular a reference time, for instance in form of clock model parameters, and a reference location. It has to be noted that also the common orbit model itself could contain, in addition to a model for satellite position and velocity data, a model for satellite clock bias and drift, a time reference for initialization, estimates for satellite position, velocity and clock accuracy and possibly as well a model for satellite attitude for phase wind-up correction for precise point positioning (PPP) calculation. The coordinate frame for position and velocity models is advantageously the ECEF frame, as an earth rotation correction can be performed easily in an ECEF frame. A conversion to local frames (East-North-Up) can be achieved with a simple matrix multiplication. IGS data may be comprised in the ECEF frame.

Further, the provided assistance data may comprise divers other information. Examples are DGPS corrections, Real Time Kinematics (RTK) corrections and carrier phase measurements for satellite signals. For a high accuracy RTK positioning, reference is made to the document WO 2004/000732 A1. Carrier phase measurements and RTK reference data, for instance, are suited to support a high-accuracy positioning. It is to be understood that RTK corrections known for GPS may be adapted as required for the support of a Galileo based positioning, etc. Further examples of additional assistance data are EGNOS and WAAS corrections. The data broadcast from geostationary EGNOS and WAAS satellites is difficult to receive in high-latitude areas. The data may therefore be provided as network assistance data instead, in particular if the common orbit model is a short-term orbit model, as the current EGNOS/WAAS corrections as such are not suitable for long-term orbit models. A further example of additional assistance data are short-term differential corrections for long-term orbit models. A still further example of additional assistance data are ionosphere model parameters and/or troposphere model parameters. A still further example of additional assistance data are short-term integrity warnings, which may be provided in the case of a sudden satellite failure, in order to exclude the satellite from position calculation. A still further example of additional assistance data are data bits of at least one satellite based positioning system enabling a data wipe-off upon a request by a mobile arrangement. Data wipe-off is a method to improve the sensitivity in a satellite signal receiver. For example, if GPS data content is unknown, it is possible to coherently integrate the GPS signals only for 20 ms periods (1 GPS bit). In the case that the data bits are known, coherent signal integration can be continued over several GPS bits giving approximately 1.5 dB gain in sensitivity every time the integration time is doubled. For example 40 ms (2 bits) could result in a gain of 1.5 dB, and 80 ms (4 bits) in a gain of 3 dB.

In one embodiment of the disclosure, the same or another network element of the communication network further replaces a reference value in the converted parameters that is based on a satellite based positioning system time by a reference value that is based on a communication system time. That is, the common orbit model is referenced to a communication system time base only, and the satellite position information can thus be calculated as a function of the communication system time instead of, for example, GPS or Galileo time.

The communication system time base can be used if the relation between the GNSS system and communication system times is accurately known to enable accurate signal phase and Doppler prediction for a high sensitivity. For the communication system time, optional fields may be provided in the assistance data, depending on the communication system. System specific information could be frame, slot and bit for GSM, system frame number, slot and chip for WCDMA, and UTC time for CDMA. Considering slot and bit or chip, respectively, as well in GSM and WCDMA ensures a sufficient resolution. The fields may also contain a time uncertainty estimate (std) for estimating the uncertainty of signal phase and Doppler predictions.

In another embodiment of the disclosure, the common orbit model is referenced to two time bases, for example UTC time and/or a communication system time. The UTC time provides a universal time reference for all GNSS systems and makes it possible to evaluate the number of possible frame/superframe rollovers specific, for example, for cellular systems. The UTC time reference is also suited to remove the problem of possible GNSS system time differences. GPS, Galileo and Glonass have different system times. Thus, biases between the system times have to be known, if the systems are used in hybrid positioning as such, for instance using one GPS signal to predict the phase of Galileo signals. This problem is removed by basing the model into a common time base, that is, UTC time. The differences between the GNSS system times can be compensated in the clock model. A common clock model can use for example a second-order continuous polynomial fit having three parameters, bias, drift and jerk. This is roughly the same as the clock model in the current GPS ICD. Still, any other model can be used as well. The clock model could also include an accuracy or uncertainty estimate for the clock error. The UTC time may also be a time stamp/ID for the orbit model.

The assistance data can be transmitted to a particular mobile arrangement, in particular upon a request by the mobile arrangement. Alternatively, however, it could also be broadcast, for instance in a respective cell of a cellular communication system.

A mobile arrangement receiving the assistance data may then estimate a position of a satellite of the at least one satellite based positioning system using the converted parameters.

II

According to a second aspect of the disclosure, a first method is proposed for supporting a satellite based positioning of a mobile arrangement with assistance data, wherein the mobile arrangement is adapted to communicate with a communication network and to acquire signals transmitted by satellites of at least one satellite based positioning system. The method comprises replacing in the communication network a reference value that is based on a satellite based positioning system time in available parameters of an orbit model describing a movement of a satellite by a reference value that is based on a communication system time. The method further comprises providing the parameters including the replaced reference value as a part of assistance data for the satellite based positioning.

According to the second aspect of the disclosure, moreover a second method is proposed for supporting a satellite based positioning of a mobile arrangement using assistance data, wherein the mobile arrangement is adapted to communicate with a communication network and to acquire signals transmitted by satellites of at least one satellite based positioning system. This method comprises receiving at the mobile arrangement assistance data from the communication network including a time stamp that is based on a communication system time. The method further comprises determining at the mobile arrangement a communication system time. The method further comprises estimating at the mobile arrangement a position of a satellite of the at least one satellite based positioning system using the parameters in the assistance data based on the determined communication system time.

According to the second aspect of the disclosure, moreover a network element for a communication network supporting a satellite based positioning of a mobile arrangement with assistance data is proposed, wherein the mobile arrangement is adapted to communicate with the communication network and to acquire signals transmitted by satellites of at least one satellite based positioning system. The network element comprising a processor or processing means. The processor or processing means are adapted to replace a reference value that is based on a satellite based positioning system time in available parameters of an orbit model describing a movement of a satellite by a reference value that is based on a communication system time. The processor or processing means are further adapted to provide parameters including a replaced reference value as a part of assistance data for the satellite based positioning.

According to the second aspect of the disclosure, moreover a mobile arrangement supporting a satellite based positioning of the mobile arrangement using assistance data is proposed. The mobile arrangement comprises a satellite signal receiver adapted to acquire signals transmitted by satellites of at least one satellite based positioning system. The mobile arrangement further comprises a communication component adapted to receive from the communication network assistance data with a time stamp that is based on a communication system time. The mobile arrangement further comprises a processor or processing means adapted to determine a communication system time. The mobile arrangement further comprises a processor or processing means adapted to estimate a position of a satellite of the at least one satellite based positioning system using parameters in received assistance data based on a determined communication system time.

According to the second aspect of the disclosure, moreover a system is proposed which comprises the proposed network element of the second aspect of the invention and the proposed mobile arrangement of the second aspect of the invention.

According to the second aspect of the disclosure, moreover a first software code for supporting a satellite based positioning of a mobile arrangement with assistance data is proposed, wherein the mobile arrangement is adapted to communicate with a communication network and to acquire signals transmitted by satellites of at least one satellite based positioning system. When being executed by a processing unit of a network element of the communication network, the software code realizes the first method of the second aspect of the invention.

According to the second aspect of the disclosure, moreover a first software program product is proposed, in which the first software code proposed for the second aspect of the invention is stored.

According to the second aspect of the disclosure, moreover a second software code for supporting a satellite based positioning of a mobile arrangement using assistance data is proposed, wherein the mobile arrangement is adapted to communicate with a communication network and to acquire signals transmitted by satellites of at least one satellite based positioning system. When being executed by a processing unit of a mobile arrangement, the software code realizes the second method of the second aspect of the invention.

According to the second aspect of the disclosure, moreover a second software program product is proposed, in which the second software code proposed for the second aspect of the invention is stored.

The second aspect of the disclosure is based on the idea that satellite positions could be estimated based on parameters of an orbit model using a communication system time instead of a satellite based positioning system time. To enable such an estimation, it is proposed that a reference value in available parameters which is based on a satellite based positioning system time is replaced by a communication system time based reference value. For example, in the case of GPS ephemeris parameters, the TOE is replaced by a communication system time and in case of GPS almanac parameters, the TOA is replaced by a communication system time. The relation between the satellite based positioning system time and communication system time must be known in the communication network in order to replace the reference values as proposed. But as the accuracy for the time relation is not very tight, the relation can be made available to the network in several ways.

It is an advantage of the second aspect of the disclosure that the assistance data is made independent of the satellite based positioning system time, and that the satellite based positioning system time does not have to be made available to the mobile arrangement.

The second aspect of the disclosure can be employed for any assisted satellite based positioning system, for example for A-GPS or assisted Galileo.

If the communication network is a GSM network, for example, the communication system time may be defined by a respective combination of a frame number, a time slot and a bit number. If the communication network is a WCDMA network, for example, the communication system time may be defined by a respective system frame number, slot and chip. All current cellular terminals, for example, already decode the frame numbers. Thus, suitable time information is already available for satellite position calculations, that is, for extrapolation of the satellite positions using a cellular communication system time.

In the case of GPS, an extension of the current GSM and WCDMA cellular standard with cellular time stamps is easy. There are already IEs and parameters for an accurate time transfer. The same parameters may be added to the ephemeris and almanac IEs to be used instead of TOE and TOA, but having the same temporal information and use as TOW. This approach would be backwards compatible too.

A mobile arrangement may receive the assistance data with the replaced reference value from the communication network. It may then determine a communication system time and estimate a position of a satellite of the at least one satellite based positioning system using the parameters in the assistance data based on a communication system time. With the satellite position information, an accurate prediction of code phases and Doppler frequencies of received satellite signals is enabled as known in the art, even though a satellite based positioning system time was not provided to the mobile arrangement.

A mobile arrangement having received assistance data from the communication network may provide by default a predetermined set of feedback items to the communication network. In existing approaches, the set of feedback items depends in contrast on the positioning mode, that is, on whether the positioning is mobile station based or mobile station assisted. The feedback data may include position information, like a determined position of the mobile arrangement, a determined velocity of the mobile arrangement, a determined time of at least one satellite based positioning system and determined measurement and/or position uncertainties. The feedback data may further include measurements on received satellite signals and/or a relation between a satellite based positioning system time and a communication system time. The feedback data may also include Observed Time Difference (OTD) measurements performed on signals received from a plurality of base stations of a communication network. The mobile arrangement may return OTD measurements to the communication network in the units of seconds, that is micro or nanoseconds, instead of frame or subframe differences, in order to make the information independent.

The mobile arrangement may also be required to maintain a relation between a time of the at least one satellite based positioning system and a communication system time. If the mobile arrangement has obtained a GNSS fix, it may associate to this end the current communication system time, for example in terms of frame, subframe, slot, bit and chip, with the determined satellite based positioning system time. Alternatively, the mobile arrangement may receive an initial time relation as assistance data. The time relation can be maintained for example by evaluating time difference information from the network, by evaluating OTD measurements carried out in the mobile arrangement and establishing a UTC-cellular time relation again if the uncertainty of the relation gets too large, or by evaluating GNSS time assistance from the network. For instance, in CDMA networks, GPS and UTC times are available by default. If a mobile arrangement has a valid time relation, this relation can be used to improve the performance in terms of time-to-first-fix and sensitivity. Performance improvements can be achieved with a time relation having an accuracy of hundreds of microseconds. The maintained time-relation may also be included in a request for assistance data by the mobile arrangement to the communication network.

The communication network may collect the position data, the time relation data and the OTD measurements provided as a feedback by mobile arrangements to create a database of time differences between the base stations. This data base can be used to deliver time-accurate assistance data to mobile arrangements for improving the sensitivity without delivering a satellite based positioning system time per se. If a mobile arrangement fails to calculate a position solution, the satellite signal measurements in the feedback, if any, can also be employed to estimate the position of the mobile arrangement in the communication network.

III

According to a third aspect of the disclosure, a method is proposed for supporting a satellite based positioning of a mobile arrangement using assistance data, wherein the mobile arrangement is adapted to communicate with a communication network and to acquire signals transmitted by satellites of at least one satellite based positioning system, and wherein the communication network is adapted to support at least two different positioning modes. The method comprises transmitting at least one set of data that is independent of an employed positioning mode in at least one direction between the mobile arrangement and the communication network in the scope of a positioning of the mobile arrangement.

According to the third aspect of the disclosure, moreover a network element for a communication network supporting a satellite based positioning of a mobile arrangement with assistance data is proposed, wherein the mobile arrangement is adapted to communicate with the communication network and to acquire signals transmitted by satellites of at least one satellite based positioning system. The network element comprises processing means, which are adapted to transmit at least one set of data that is independent of an employed positioning mode to the mobile arrangement and/or to receive at least one set of data that is independent of an employed positioning mode from the mobile arrangement in the scope of a positioning of the mobile arrangement.

According to the third aspect of the disclosure, moreover a mobile arrangement supporting a satellite based positioning of the mobile arrangement using assistance data is proposed. The mobile arrangement comprises a satellite signal receiver adapted to acquire signals transmitted by satellites of at least one satellite based positioning system. The mobile arrangement further comprises a communication component adapted to transmit at least one set of data that is independent of an employed positioning mode to a communication network and/or to receive at least one set of data that is independent of an employed positioning mode from the communication network in the scope of a positioning of the mobile arrangement.

According to the third aspect of the disclosure, moreover a system is proposed which comprises the proposed network element of the third aspect of the invention and the proposed mobile arrangement of the third aspect of the invention.

According to the third aspect of the disclosure, moreover a first software code for supporting a satellite based positioning of a mobile arrangement with assistance data is proposed, wherein the mobile arrangement is adapted to communicate with a communication network and to acquire signals transmitted by satellites of at least one satellite based positioning system. When being executed by a processing unit of a network element of the communication network, the software code transmits at least one set of data that is independent of an employed positioning mode to the mobile arrangement and/ or receives at least one set of data that is independent of an employed positioning mode from the mobile arrangement in the scope of a positioning of the mobile arrangement.

According to the third aspect of the disclosure, moreover a first software program product is proposed, in which the first software code proposed for the third aspect of the invention is stored.

According to the third aspect of the disclosure, moreover a second software code for supporting a satellite based positioning of a mobile arrangement using assistance data is proposed, wherein the mobile arrangement is adapted to communicate with a communication network and to acquire signals transmitted by satellites of at least one satellite based positioning system. When being executed by a processing unit of the mobile arrangement, the software code transmits at least one set of data that is independent of an employed positioning mode to the communication network and/or receives at least one set of data that is independent of an employed positioning mode from the communication network in the scope of a positioning of the mobile arrangement.

According to the third aspect of the disclosure, finally a second software program product is proposed, in which the second software code proposed for the third aspect of the invention is stored.

The third aspect of the disclosure proceeds from the consideration that current assistance standards all provide different specifications for different positioning modes. In order to unify and simplify the specifications and the processing, it is proposed that at least one set of data that is exchanged between a mobile arrangement and a communication network in the scope of a positioning is substantially the same, no matter which positioning mode is employed.

The at least one set of data may belong for example to assistance data that is transmitted from the communication network to the mobile arrangement. This allows providing as well that the operations performed in the mobile arrangement for the satellite based positioning are substantially the same irrespective of an employed positioning mode.

The at least one set of data may further belong to feedback information transmitted from the mobile arrangement to the communication network. In this case, the at least one set of data may comprise for instance measurement information for satellite signals acquired by the mobile arrangement. If the mobile arrangement determines itself its position based on the acquired satellite signals, the determined position may be added to the common set of data.

It has to be noted that the position of the mobile arrangement can be calculated in both the mobile arrangement and the communication network.

IV

A further aspect of the disclosure proceeds from the consideration that instead of calculating any kind of correction data based on normal ephemeris parameters, this correction data could be calculated based on parameters of a long-term orbit model that have a validity of at least one day. As a result, the correction data can be utilized with the long-term orbital parameters, not only with short term ephemeris parameters. The parameters may have been provided earlier than the correction data or be provided at the same time as the correction data. The correction data could be for instance WAAS, EGNOS or DGPS correction data, but also another or a new type of correction data.

Also the accuracy of parameters of a long-term orbit model degrades over time. But with the proposed correction data, it is possible to extend even the life span of these long-term orbital parameters.

The proposed correction data thus allows enhancing the accuracy and the integrity of long-term orbit models. As the orbit model updates have to be less frequent with accurate correction data, the amount of data that has to be transferred between a communication network and a mobile arrangement is reduced and the load on the bandwidth is lowered. Also the correction models can be more accurate and long-term than existing models. Due to the nature of selective availability, DGPS corrections, for example, were initially developed to be very short-term corrections and not very accurate. Because selective availability is nowadays turned off, a new type of DGPS correction can be designed to be very accurate. Further, a single format of correction data can be used for all satellite constellations, like GPS, Galileo, Glonass, etc.

On the network side, a server may calculate the correction data for the long-term orbit models in accordance with the third aspect of the disclosure. The parameters of the long-term orbit model may be valid for several days and require some network bandwidth when being transmitted as a part of the assistance data to the mobile arrangement. The correction data may be valid for several hours, but it requires less bandwidth then a transmission of the parameters of the long-term orbit model. A respective set of correction data can be calculated in various ways. The actual correction data can be calculated for instance based on real measurements from reference stations or based on an existing EGNOS/WAAS model. The form of the actual correction data does not depend on how the corrections were calculated.

On the side of a mobile arrangement, the correction data is received and used for correcting the parameters of a long-term orbit model before a respective estimation of a satellite position is performed. The implementation in the mobile arrangement may use the provided correction data in a similar manner as the conventional DGPS corrections. However, the calculation of a pseudorange correction amount per satellite depends on the correction model.

The model that is employed for computing the correction data can be for instance some high-grade polynomial, like a $2^{nd}$ or $3^{rd}$ order polynomial, a piece-wise continuous polynomial, or even a more complex model.

It is to be understood that the proposed calculation of correction data can be used with each of the first aspect of the invention, the second aspect of the invention and the third aspect of the invention.

Any of the network elements of the first, the second and the third aspect of the disclosure can be for example a network server or a base station of the communication network. The communication network in the first, the second and the third aspect of the invention can be for example a cellular communication network like a GSM network, a WCDMA network or a CDMA network, etc., but equally a non-cellular network, like a WLAN, a Bluetooth™ network or a WiMax network, etc. The mobile arrangements in the first, the second and the third aspect of the invention may comprise a mobile communication device like a mobile phone, in which a satellite signal receiver is integrated. Alternatively, the satellite signal receiver can be an accessory device for the mobile communication device.

It is to be understood that all details described for the first aspect of the disclosure can also be combined with embodiments of the second aspect of the disclosure, and vice versa.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
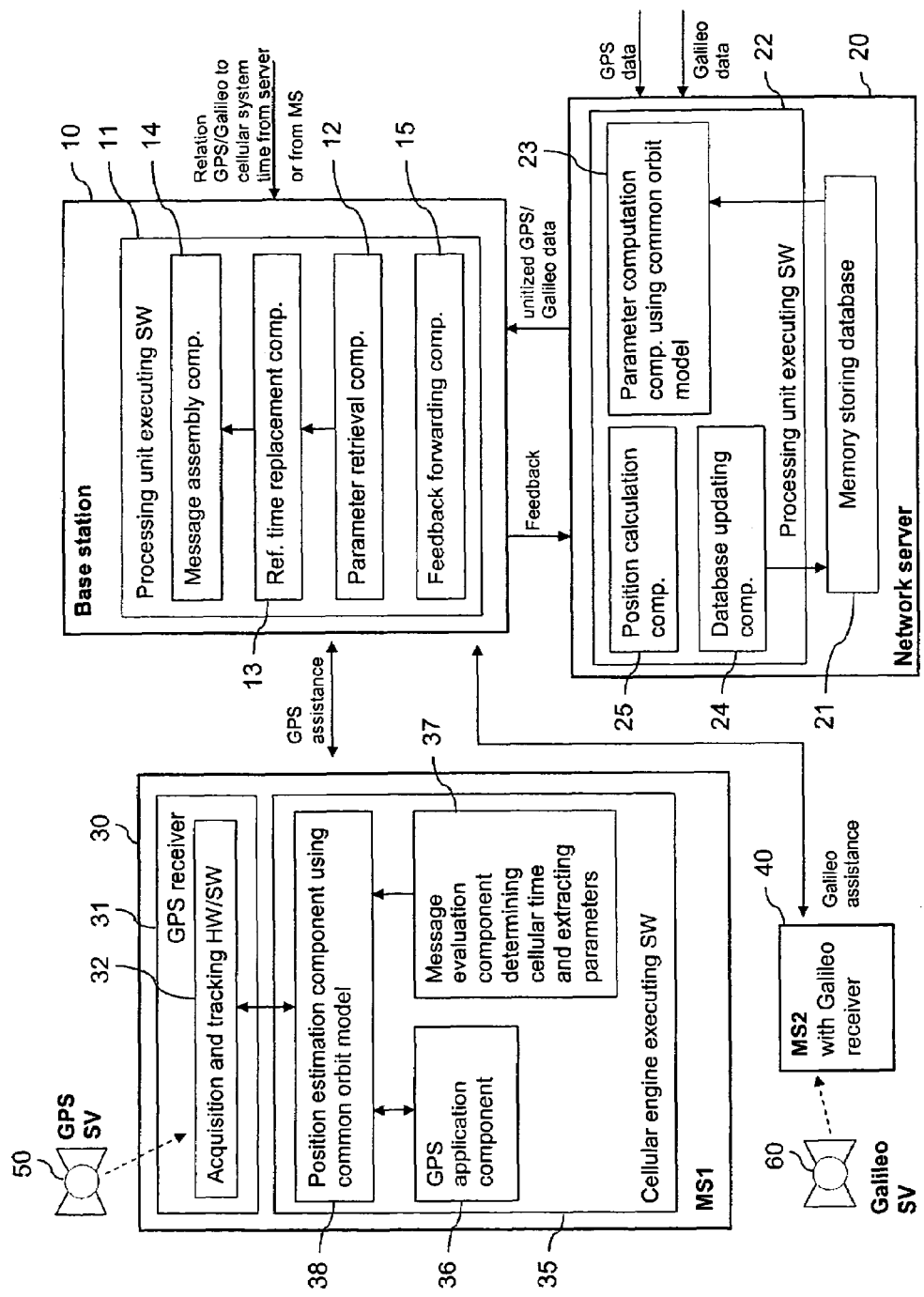
FIG. 1 is a schematic block diagram of a system supporting A-GNSS.

FIG. 1 is a schematic block diagram of a system supporting A-GNSS in accordance with an embodiment. The system avoids the necessity of providing GNSS time as assistance data and unitizes the provision of assistance data.

The system comprises a base station 10 and a network server 20 of a GSM network or of any other cellular communication network. The system further comprises a first mobile station (MS1) 30, a second mobile station (MS2) 40, GPS satellites (GPS SV) 50 and Galileo satellites (GPS SV) 60.

The base station 10 provides a radio interface to mobile stations 30, 40 located in its vicinity. It comprises a processing unit 11 that is able to execute various implemented software code components, including a parameter retrieval component 12, a reference time replacement component 13, a message assembly component 14 and a feedback forwarding component 15.

The network server 20 can be accessed by various base stations 10 of the cellular communication network. Moreover, it is connected to a GPS control server and to a Galileo control server (not shown). It comprises a computer readable medium such as a memory 21 storing a database and a processing unit 22 that is able to execute various implemented software code components likewise stored on a computer readable medium, including a parameter computation component 23, a database updating component 24 and a position estimation component 25.

The first mobile station 30 is a mobile arrangement which includes a GPS receiver 31. The GPS receiver 31 comprises an acquisition and tracking component 32, which may be realized in hardware and/or in software. For instance, for acquiring and tracking signals received from GPS satellites 50, signal measurement tasks, including correlation tasks, could be performed by hardware under control of a software code which is executed by a processing unit of the GPS receiver 31.

The mobile station 30 further includes a cellular engine 35 as a cellular communication component. A cellular engine is a module which comprises all components required for a conventional mobile communication between the mobile phone 30 and a cellular communication network and which may further be enhanced with additional functions. The cellular engine 35 is or comprises to this end a data processing unit that is able to execute various implemented software code components stored on a computer readable medium. In the presented embodiment, these software code components include an application component 36, a message evaluation component 37 and a position estimation component 38. The application realized by the application component 36 can be any application which requires position related information, for example a navigation application or an application which ensures that specific services are offered to a user of the mobile station 30 at specific locations, etc. It is to be understood that, alternatively, the application component 36 and the position estimation component 38 could be executed by some other processing unit, for example by a processing unit of the GPS receiver 31.

The second mobile station 40 has a similar design as the first mobile station 30, but instead of a GPS receiver it includes a Galileo receiver adapted to acquire and track signals received from Galileo satellites 60. Alternatively, the second mobile station 40 could comprise for example a hybrid GPS and Galileo receiver.

Figure 2:
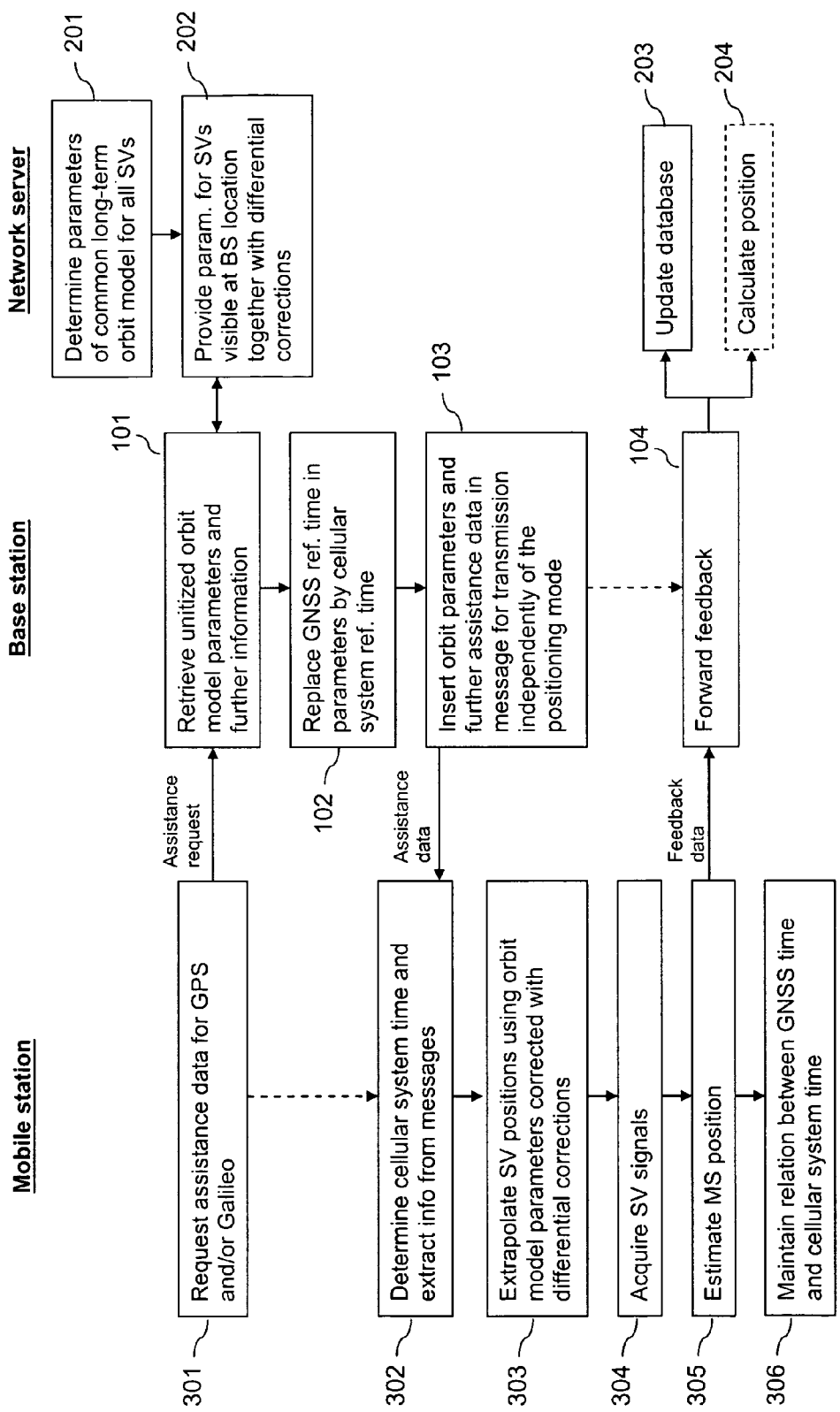
FIG. 2 is a flow chart illustrating an operation in the system of FIG. 1.

The determination of position information for a mobile station 30, 40 in the system of FIG. 1 will now be described with reference to FIG. 2. FIG. 2 is a flow chart, which illustrates on the left hand side an operation in one of the mobile stations 30, 40, in the middle an operation in the base station 10 and on the right hand side an operation in the network server 20.

The network server 20 receives at regular intervals GPS ephemeris and almanac parameters from the GPS control server for all available GPS satellites 50, and corresponding Galileo parameters from the Galileo control server for all available Galileo satellites 60. The GPS parameters comply with the GPS interface control document (ICD) and belong thus to a GPS specific ephemeris or almanac orbit model, respectively. The Galileo parameters comply with a Galileo ICD and belong thus to a Galileo specific orbit model. The network server 20 may also receive additional information from the GPS control server, from the Galileo control server or from another entity. Such other entity may provide for instance EGNOS and WAAS corrections that are broadcast by geostationary EGNOS and WAAS satellites.

The parameter computation component 23 converts the received GPS parameters into parameters of a common orbit model (step 201). Further, it converts the received Galileo parameters into parameters of the same common orbit model. The satellite for which the respective parameters are valid may be identified for example using indices containing not only PRN, but also a constellation ID. The common orbit model is a specification that describes orbital parameters and algorithms to calculate satellite position information, like position, velocity and acceleration for GPS and Galileo satellites, and possibly as well for satellites of any other GNSS, like GLONASS, EGNOS and/or WAAS. In addition, the common orbit model may allow calculating corrections to satellite signals due to clock drifting. It has to be noted that any correction data, including WAAS-, EGNOS- and/or DGPS-like correction data, may be calculated or re-calculated specifically for the employed common orbit model.

By the parameter conversion, the parameters of different GNSSs are unitized, that is the number of parameters and the word length of the parameters is exactly the same for GPS and Galileo, etc. The parameters of the common orbit model may further be valid for a longer period of time than the GPS ephemeris parameters. Moreover, they may define the position of the satellites more accurately than, for instance, the GPS almanac orbit model. This can be achieved for example by using more parameters or by using longer word lengths than defined for the parameters transmitted by the satellites. Thus, the common orbit model may also be the only orbit model, for example, for GPS. It is to be understood that the conversion of the parameters comprises also a re-calculation of the parameters.

The generated parameters of the common orbit model for a respective satellite comprise a reference value, which constitutes a reference time for the included information that is based on the system time of the GNSS to which the satellite belongs, just like the TOE for GPS ephemeris data or the TOA for GPS almanac data. For example, for a GPS satellite, the reference time is based on the TOW count of GPS, like the TOE or the TOA.

Now, the application component 36 of a mobile station 30, 40 may need some position related information. For obtaining the required information, it may request assistance data for GPS and/or for Galileo from the cellular communication network (step 301). The assistance request indicates the GNSS type that is supported by the mobile station 30, 40.

When the base station 10 receives the assistance request, the parameter retrieval component 12 instructs the network server 20 to provide the parameters of the common orbit model for those satellites 50, 60 of the supported GNSS or GNSSs that are currently visible at the location of the base station 10 (step 101). The instruction comprises an identification of the base station 10 and an identification of the GNSS or GNSSs.

Thereupon, the parameter computation component 23 of the network server 20 determines the satellites 50, 60 that are currently visible at the location of the base station 10 and that belong to the indicated GNSS or GNSSs (step 202). The current position of the satellites can be determined by means of the generated orbit model parameters. The satellites that are currently visible at an identified base station 10 can thus be determined easily, if an association between the respective identification of all base stations and their location is stored in the network server 20, for example in the database in the memory 21. The parameter computation component 23 selects the orbit model parameters for the currently visible satellites and provides them to the base station 10, possibly together with additional information. Such additional information may comprise for instance DGPS and RTK corrections, EGNOS and/or WAAS corrections, short-term differential corrections, short-term integrity warnings and carrier phase measurements. Upon a special request by a mobile station 30, 40 forwarded by the base station 10, the additional information may also comprise data bits for a data wipe-off.

The parameter retrieval component 12 of the base station 10 receives the provided information and provides them to the reference time replacement component 13.

The reference time replacement component 13 of the base station 10 replaces the GNSS based reference time of the orbit model parameters for each visible satellite 50, 60 by a cellular system based reference time (step 102). In case the cellular communication network is a GSM network, the cellular system based reference time can comprise for example a constellation of a frame number, a time slot and a bit number {FN,TS,BN}, which represents the time of the GNSS based reference time. In case the cellular communication network is a WCDMA network, the cellular system based reference time can comprise for example a system frame number (SFN), slot and chip, which represent the time of the GNSS based reference time.

In order to be able to replace the GNSS based reference time with the cellular system based reference time, the base station 10 has to be aware of the current relation between the GNSS time and the cellular communication system time. There are several alternatives of providing the base station 10 with this relation, since the requirement on the accuracy of the relation is not very tight. It is sufficient to have a relation with an accuracy of 10-100 µs, or even with an accuracy of 1 ms. A satellite moves at approximately 3.8 km/s, so the position error in the satellite position in 1 ms is 4 meters at the most, which is negligible.

In a first alternative, an LMU is associated to the base station 10. In this case, the LMU may determine the GNSS time and provides it to the base station 10. The base station 10 may then determine the relation itself. It has to be noted, though, that it would be rather expensive to provide all base stations of the network with an own LMU.

In a second alternative, there is only one LMU available in the cellular communication network, and the time differences to all base stations 10 are measured by the cellular communication network at the site of this LMU. For instance, a single base station in the network may be equipped with an LMU to create a relation between a GNSS time and a cellular communication system time. The time differences between the LMU-equipped base station and all other base stations 10 in the network are measured in order to create a GNSS time to cellular communication system time relation for any base station 10 in the cellular communication network. The time differences can be measured, for example, by collecting and evaluating OTD-measurements reported by default by mobile stations 30, 40 to the cellular communication network.

In a third alternative, there is equally only one LMU available in the cellular communication network, and the time differences are measured with a Matrix solution. In this alternative, the mobile stations 30, 40 are harnessed for measuring the base station time differences based on OTD-measurements. Cambridge Positioning Systems Ltd (CPS), for instance, has proposed a positioning and time keeping method using this approach. This method comprises more specifically measuring base station time differences at the mobile station, maintaining a corresponding database in the mobile station and using this database for positioning and GPS time keeping. The method is called Enhanced-GPS (E-GPS). The use of the E-GPS method enables the cellular communication network as well to obtain the time differences in the cellular system between the LMU base station and the other base stations 10, if the time differences determined at the mobile stations 30, 40 are reported to the cellular communication network.

In a fourth alternative, no LMU is required in the cellular communication network. Instead, the mobile station 30, 40 provides the relation between the GNSS time and the cellular communication system time. If the mobile station 30, 40 already has a valid relation either from a previous positioning session or from the E-GPS solution, this information can be sent to the cellular communication network along with the assistance request. Some options for obtaining and maintaining a valid time relation in a mobile station 30, 40 will be described in some more detail further below with reference to step 306. The base station 10 may then use the time relation provided by the mobile station 30, 40 to calculate the cellular system based reference time for the orbit model parameters.

Associating a GNSS time to a cellular communication system time has also been described in U.S. Pat. Nos. 6,678,510 B2 and 6,748,202 B2, to which it is referred.

Once the GNSS based reference time in the orbit model parameters for each visible satellite 50, 60 of the supported GNSS has been replaced by a respective cellular system based reference time, the message assembly component 14 assembles a message for each of these satellites 50, 60 (step 103). The message is the same for any type of positioning mode. The message includes Information Elements (IE) with the orbit model parameters, including the replaced reference time. In addition, it may include a reference location, namely the known location of the base station 10. Further, it may include any of the information provided by the network server 20, information provided by some other entity, or information generated at the base station 10 itself.

The messages are then transmitted to the requesting mobile station 30, 40.

It has to be noted that alternatively, the base station 10 could assemble such messages at regular intervals for all respectively visible satellites 50, 60 and broadcast the messages to all mobile stations 30, 40 located in the cell that is served by the base station 10.

The message evaluation component 37 of the mobile station 30, 40 receives the messages and decodes the frame number, time slot and bit number in order to determine the cellular communication system time. Further, it extracts the information included in the received messages (step 302). An indication of the cellular communication system time, possibly in relation to the local time, and the extracted information, including the orbit model parameters, are provided to the position estimation component 38.

The position estimation component 38 knows the algorithms of the common orbit model. Based on these algorithms, the position estimation component 38 extrapolates the respective satellite trajectory as a function of the current cellular communication system time using the provided orbit model parameters, and possibly taking account of the short-term differential corrections, etc. (step 303). Based on the obtained satellite trajectory, the position estimation component 38 may limit the possible propagation time of the satellite signal and the occurring Doppler frequency in a conventional manner. With known limits of the propagation time and the Doppler frequency, also the possible code phases that have to be checked can be limited. Such code phase limitations are carried out for all satellites for which orbit model parameters have been provided, except for those, for which a short-term integrity warning has been provided in addition. A short-term integrity warning may be provided by the network server 20 via the base station 10 whenever there is a sudden satellite failure.

The position estimation component 38 forwards the determined code phase limitations and possibly further information included in the received messages to the acquisition and tracking component 32. The acquisition and tracking component 32 acquires the visible satellites (step 304). The information is used in a conventional manner to accelerate an acquisition of satellite signals by limiting the search options. The acquisition and tracking component 32 may also be responsible for decoding the navigation data in the acquired satellite signals. The acquisition and tracking component 32 provides the measurement results, including any decoded navigation data, to the position estimation component 38.

The position estimation component 38 may now determine the position of the mobile station 30, 40 in a conventional manner (step 305). That is, it determines pseudo ranges to those satellites 50, 60 of which signals have been acquired. Further, it determines the exact satellite positions based on the decoded navigation data at the time of transmission of the signals, which is indicated in the decoded navigation data and refined by the measurement results. The position estimation component 38 then uses the pseudo ranges together with the determined satellite positions for estimating the position of the mobile station. The position estimation component 38 may equally determine in a conventional manner any other desired position related information like velocity, GNSS time, measurement and position uncertainties, etc. The determined position related information may then be provided to the application component 36 for the intended use.

By default, the position estimation component 38 of the mobile station 10 provides the determined position related information, the received measurement results and a relation between the cellular communication system time and the GNSS time as feedback data to the cellular communication network. The feedback data is always the same irrespective of the employed positioning mode, except that the position of the mobile station 10 may only be provided if it is determined by the mobile station 10. The feedback data is forwarded by the feedback forwarding component 15 of the base station 10 to the network server 20 (step 104).

The database updating component 24 of the network server 20 may collect the position information, the relation between cellular communication system time and GNSS time and in addition OTD measurements to create and update a database 21 of time differences between various base stations (step 203). This database 21 can be used to deliver time-accurate assistance data to mobile stations 30, 40 for improving the sensitivity without delivering GNSS time per se.

The positioning calculation component 25 of the network server 20 may use measurement results in the feedback data, if any, to estimate the position of the mobile station 30, 40, in case the mobile station 30, 40 failed to calculate a position itself (204).

The mobile station 30, 40 may also maintain the relation between the cellular communication system time and the GNSS time by default (step 306). This can be done if the mobile station 30, 40 has obtained a valid GNSS fix and has been able to associate the current cellular communication system time, for example in terms of frame, subframe, slot, bit and chip, with the GNSS time or has received the initial relation as assistance data. In this case, the mobile station 30, 40 can reconstruct or recover the GNSS time at any moment just by estimating the elapsed time from the last GNSS fix using the cellular communication system time and assuming that the mobile station 30, 40 does not move from one cell to another. If the mobile station 30, 40 moves from one cell to another, the relation between the GNSS time and the cellular communication system time has to be created again based on a new GNSS fix. Alternatively, the existing relation can be updated with the time difference between the base station serving the previous cell and the base station serving the current cell. The time difference can be obtained from OTD network assistance, assuming that there is a time difference database available. The time difference can further be obtained from OTD measurements that the terminal performs itself. The time difference can further be obtained from the difference of timing advance and/or round trip time measurements in the previous and the current cell.

Further alternatively, the time relation can be maintained for example from GPS time assistance from the cellular communication network. In CDMA networks, for example, GPS time is available by default.

If the mobile station 30, 40 has a valid GNSS-to-cellular communication system time relation, this relation can be used to improve the performance in terms of time-to-first-fix and sensitivity. GNSS-to-cellular communication system time relation having an accuracy of hundreds of microseconds is sufficient for these performance improvements.

The mobile station 30, 40 may return performed OTD measurements to the cellular communication network with each request for assistance data (step 301). It may return the OTD measurements for example in the units of seconds, in particular microseconds or nanoseconds, instead of frame or subframe differences, to make the information independent of the cellular communication system time.

It is to be noted that the described embodiment constitutes only one of a variety of possible embodiments of the invention. For example, instead of GPS and/or Galileo, other or additional GNSS could be supported as well. As mentioned above, instead of a GSM network, any other type of cellular communication network could be employed too. Also some processing could be shifted between different elements. By way of example, the reference time replacement could equally be performed centrally for all base stations in the network server. Further, the provided information can be varied. Moreover, instead of a new orbit model, the known GPS ephemeris and/or GPS almanac orbit models could be used for the GPS satellites and also for other GNSS satellites. Also one or more orbit models standardized for another specific GNSS could be used. Further, the reference time replacement is not required, in case GNSS time is readily available at the mobile stations, etc.

The invention claimed is:

1. A method for supporting a satellite based positioning of a mobile device using assistance data, said method comprising at said mobile device:
   receiving assistance data from a communication network including parameters of an orbit model describing a movement of a respective satellite of a particular satellite based positioning system,
   wherein said parameters have a format that is different from a format of parameters of an orbit model defined for said satellite based positioning system or have been derived from another source than broadcast satellite data;
   receiving differential corrections for said received parameters of said orbit model; and
   correcting said received parameters of said orbit model based on said differential corrections.

2. The method according to claim 1, wherein said orbit model of which parameters are received is more accurate than said orbit model defined for said satellite based positioning system.

3. The method according to claim 1, further comprising at said mobile device estimating a position of said satellite based on said received parameters of said orbit model.

4. The method according to claim 1, further comprising estimating a position of said mobile device in said mobile device using said received parameters of said orbit model.

5. A method for supporting a satellite based positioning of a mobile device with assistance data, said method comprising:
   obtaining in a communication network parameters of an orbit model describing a movement of a respective satellite of a particular satellite based positioning system, wherein said obtained parameters have a format that is different from a format of parameters of an orbit model defined for said satellite based positioning system or are derived from another source than broadcast satellite data; and providing said obtained parameters and differential corrections for said obtained parameters as a part of assistance data for said satellite based positioning to at least one mobile device, wherein said differential corrections enable a mobile device to correct said parameters.

6. The method according to claim 5, wherein said orbit model of which parameters are obtained is more accurate than said orbit model defined for said satellite based positioning system.

7. The method according to claim 5, said method further comprising providing correction data for said orbit model of which parameters are obtained to said at least one mobile device.

8. The method according to claim 5, further comprising estimating in said communication network a position of a mobile device to which said obtained parameters are provided using a feedback from said mobile device.

9. The method according to claim 5, wherein said assistance data is transmitted to a particular mobile device upon a request by said mobile device.

10. An apparatus supporting a satellite based positioning of said apparatus using assistance data, said apparatus comprising:
   a communication component adapted to receive assistance data from a communication network including parameters of an orbit model describing a movement of a respective satellite of a particular satellite based positioning system and differential corrections for said parameters of said orbit model, wherein said parameters have a format that is different from a format of parameters of an orbit model defined for said satellite based positioning system or have been derived from another source than broadcast satellite data; and
   a processing unit configured to correct said received parameters of said orbit model based on said differential corrections.

11. The apparatus according to claim 10, wherein said communication component is further adapted to receive correction data for said received parameters of said orbit model, said apparatus comprising a processing component adapted to correct said received parameters of said orbit model based on said correction data.

12. The apparatus according to claim 10, comprising a processing component adapted to estimate a position of said apparatus using received parameters of said orbit model.

13. A apparatus for supporting a satellite based positioning of a mobile device with assistance data, said apparatus comprising a processing component adapted to obtain parameters of an orbit model describing a movement of a respective satellite of a particular satellite based positioning system, wherein said obtained parameters have a format that is different from a format of parameters of an orbit model defined for said satellite based positioning system or are derived from another source than broadcast satellite data; and adapted to provide said obtained parameters and differential corrections for said obtained parameters as a part of assistance data for said satellite based positioning to at least one mobile device, wherein said differential corrections enable a mobile device to correct said parameters.

14. The apparatus according to claim 13, wherein said processing component is further adapted to provide correction data for said orbit model of which parameters are obtained to said at least one mobile device.

15. The apparatus according to claim 13, wherein said processing component is further adapted to estimate a position of a mobile device to which said obtained parameters are provided using a feedback from said mobile device.

16. A computer readable medium having software code stored thereon for supporting a satellite based positioning of a mobile device using assistance data, said software code realizing the method of claim 1 when being executed by a processing unit of said mobile device.

17. A computer readable medium having software code stored thereon for supporting a satellite based positioning of a mobile device with assistance data, said software code realizing the method of claim 5 when being executed by a processing unit of a network element of a communication network.

18. An apparatus comprising:
means for receiving assistance data from a communication network including parameters of an orbit model describing a movement of a respective satellite of a particular satellite based positioning system and for receiving differential corrections for said received parameters of said orbit model, wherein said parameters have a format that is different from a format of parameters of an orbit model defined for said satellite based positioning system or have been derived from another source than broadcast satellite data; and
means for correcting said received parameters of said orbit model based on said differential corrections.

19. An apparatus comprising:
means for obtaining in a communication network parameters of an orbit model describing a movement of a respective satellite of a particular satellite based positioning system, wherein said obtained parameters have a format that is different from a format of parameters of an orbit model defined for said satellite based positioning system or are derived from another source than broadcast satellite data; and
means for providing said obtained parameters and differential corrections for said obtained parameters as a part of assistance data for said satellite based positioning to at least one mobile device, wherein said differential corrections enable a mobile device to correct said parameters.

* * * * *